(12) United States Patent
Chen

(10) Patent No.: US 8,605,849 B2
(45) Date of Patent: Dec. 10, 2013

(54) GLITCH FREE OVERSAMPLING CLOCK AND DATA RECOVERY

(75) Inventor: Yu-Chi Chen, Taipei (TW)

(73) Assignee: Taiwan Semiconductor Manufacturing Company, Ltd. (TW)

(*) Notice: Subject to any disclaimer, the term of this patent is extended or adjusted under 35 U.S.C. 154(b) by 499 days.

(21) Appl. No.: 12/905,235

(22) Filed: Oct. 15, 2010

(65) Prior Publication Data

US 2012/0093273 A1   Apr. 19, 2012

(51) Int. Cl.
*H04L 7/00* (2006.01)

(52) U.S. Cl.
USPC ............................................. 375/371

(58) Field of Classification Search
USPC ......... 375/316, 322, 324, 326, 354, 355, 360, 375/371; 326/93
See application file for complete search history.

(56) References Cited

U.S. PATENT DOCUMENTS

| | | | |
|---|---|---|---|
| 6,545,507 B1* | 4/2003 | Goller | 326/93 |
| 6,606,360 B1* | 8/2003 | Dunning et al. | 375/354 |
| 2003/0086517 A1* | 5/2003 | Vallet et al. | 375/355 |
| 2006/0125665 A1* | 6/2006 | Lin | 341/100 |
| 2011/0170644 A1* | 7/2011 | Iqbal et al. | 375/355 |

* cited by examiner

*Primary Examiner* — Sam K Ahn
*Assistant Examiner* — Vineeta Panwalkar
(74) *Attorney, Agent, or Firm* — Lowe Hauptman & Ham, LLP

(57) ABSTRACT

A clock and data recovery (CDR) circuit includes an edge detector, an edge selector, and a phase selector. The edge detector is arranged to detect edges of serial input data and to provide an edge detection result. The serial input data is oversampled utilizing multiple clock phases. The edge selector for selecting one of the multiple clock phases for a recovered clock is arranged to provide an edge selection result, to receive the last edge selection result as a first input, and to receive the edge detection result as a second input. The phase selector is arranged to provide the recovered clock and recovered data.

7 Claims, 5 Drawing Sheets

US 8,605,849 B2

GLITCH FREE OVERSAMPLING CLOCK AND DATA RECOVERY

TECHNICAL FIELD

The present disclosure relates generally to an integrated circuit and, more particularly, to a clock and data recovery circuit.

BACKGROUND

In the field of high-speed serial data communications, e.g., with regard to a universal serial bus, clock and data recovery (CDR) circuits are often used. In many applications, high-speed data streams are sent without an accompanying clock signal. The CDR on the receiver generates a clock from an approximate frequency reference, and then phase-aligns to the transitions in the data stream. However, data jitter and phase error between clock and data can cause glitches (a pulse too small to trigger a flip flop or a logic gate properly) in recovered clock and data errors in the CDR. Furthermore, integrated circuit process deviations, operating temperature, and power supply variations can also have a negative impact on sampling window width and thus on the recovered clock and data accuracy.

BRIEF DESCRIPTION OF THE DRAWINGS

Reference is now made to the following descriptions taken in conjunction with the accompanying drawings, in which.

DETAILED DESCRIPTION

The making and using of various embodiments are discussed in detail below. It should be appreciated, however, that the present disclosure provides many applicable inventive concepts that can be embodied in a wide variety of specific contexts. The specific embodiments discussed are merely illustrative of specific ways to make and use, and do not limit the scope of the disclosure.

Figure 1:
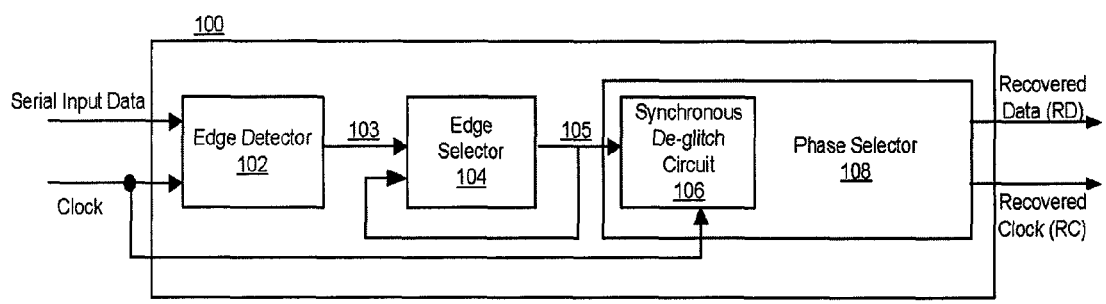
FIG. 1 is a schematic diagram showing an exemplary clock and data recovery (CDR) circuit according to some embodiments.

FIG. 1 is a schematic diagram showing an exemplary clock and data recovery (CDR) circuit according to some embodiments. The CDR circuit 100 includes an edge detector 102, an edge selector 104, a synchronous de-glitch circuit 106, and a phase selector 108. As the CDR circuit 100 receives serial input data, for the edge detector circuit 102 oversamples multiple data samples during each data bit period utilizing an oversampling circuit (not shown) and multiple clock phases of a reference clock input.

For example, the edge detector 102 can oversample the serial input data at N phases, and the N phases divide one clock period equally (N is a positive integer), e.g., oversampling data by using 5 clock phases. The edge detector circuit 102 detects the occurrence of data transitions (i.e., edges) between two consecutive data samples to provide edge detection results 103.

The edge selector 104 selects appropriate edges from one of the multiple clock phases for a recovered clock (RC), based on the detected edges from the edge detector 102. The edge selector 104 selects so that the selected clock phase is close to a middle point between the detected edges of the serial input data, because the best sample to represent the recovered data (RD) is the sample which is the farthest from the data edges (or data transitions), less affected by jitters and phase errors. The edge selector 104 is arranged to receive the edge detection results 103 as an input and provide an edge selection result 105, while the last edge selection result 105 is feedback as an input to the edge selector 104. The mechanism of the edge selector 104 is further described below for FIG. 2.

The phase selector 108 is arranged to select clock phases based on the edge selection result 105 and provide the recovered clock (RC) and recovered data (RD) by using the selected clock phase as RC and the data sample based on the RC as the RD. The phase selector 108 is synchronous in that the phase selector 108 includes a synchronous de-glitch circuit 106 to avoid RC glitches. The mechanism of the synchronous de-glitch circuit 106 in the phase selector 108 is described below for FIG. 3.

Figure 2:
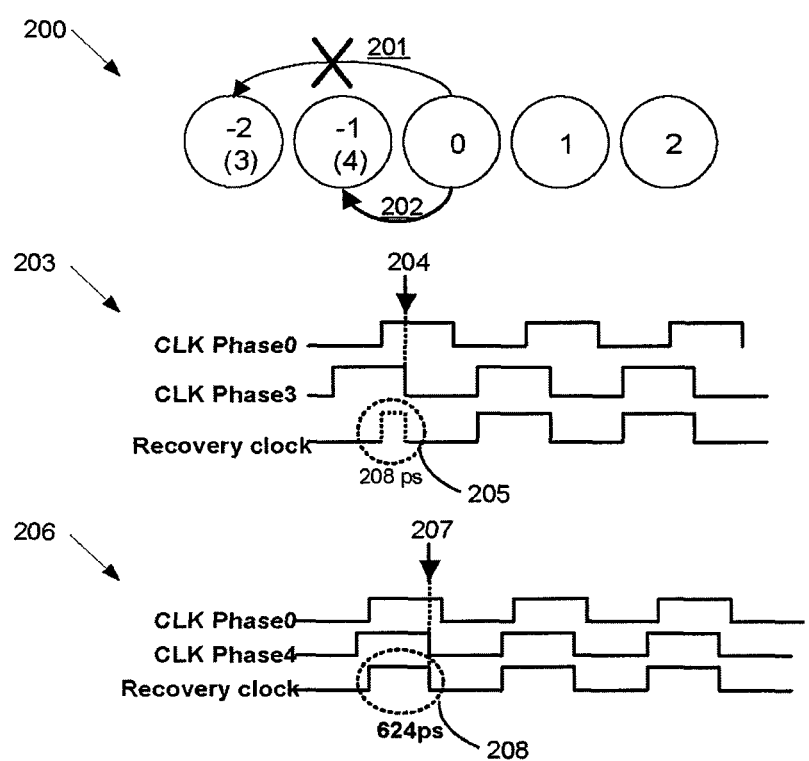
FIG. 2 is a schematic diagram showing an exemplary clock phase selection of the CDR circuit in FIG. 1 according to some embodiments.

FIG. 2 is a schematic diagram showing an exemplary clock phase selection of the CDR circuit in FIG. 1 according to some embodiments. A phase transition diagram 200 shows an exemplary clock phase selection in the edge selector 104 based on the detected edges from edge detector 102. In this example, there are 5 clock phases used for oversampling the serial input data to the CDR circuit 100. Each clock phase is assigned a phase number, e.g., −2, −1, 0, 1, 2. The 5 clock phases equally divide one data bit clock into 5 phases, and the phase difference between each adjacent phase number is the same. The phase number 0 is assigned to the currently selected clock phase. A phase number 3 and −2 are congruent modulo 5, and indicates the same clock phase (among the 5 clock phases). Likewise, a phase number 4 and −1 are congruent modulo 5, and indicates the same clock phase among the 5 clock phases.

Depending on the detected edges, the edge selector 104 may select the phase number −2 (or 3) for the next clock phase. Assuming X is the phase number of a currently selected clock phase (e.g., 0) for sampling, this corresponds to jumping to a phase number "X+Round (N/2)", where in N is the number of clock phases (e.g., N=5), and Round is a round half up function (e.g., Round (2.5)=3).

In some cases, jumping to "X+Round (N/2)" phase causes glitches in RC, as shown in 203. When a clock phase jumps from a phase number 0 to a phase number 3 at time 204 on the falling edge of clock phase 3, a short pulse 205 (e.g., 208 ps compared to 1 ns clock pulse) can occur in RC, which causes a glitch. When this happens, i.e., the edge selector 104's edge selection result 105 has a phase number "X+Round (N/2)", where "X" is the phase number of the last edge selection result, the edge selector 104 provides a new edge selection result 105 to prevent causing a glitch. In one embodiment, a new edge selection result 105 has a phase number of "X+Round (N/2)+1", e.g., 4 (or −1). Thus, instead of having a clock phase change 201 from the phase number at 0 to the phase number at 3 (or −2), the edge selector 104 selects a new clock phase change 202 to the phase number at 4 (or −1).

The RC from this new selection is shown in 206. At time 207, the RC clock phase change from the phase number 0 to 4 on the falling edge of clock phase 4, and RC has a pulse 208 with more reasonable pulse width (e.g., 624 ps) instead of the short pulse 205 (208 ps) in 203, which does not cause a glitch in RC (and correctly sample the RD).

Depending on embodiments, the above mechanism can have variations. For example, the Round function can be round half down, and a new phase number can be "X+Round (N/2)−1" if the phase number changes from "X" to "X+Round (N/2)". A person skilled in the art will appreciate that there can be many variations of the embodiments described in this disclosure.

Figure 3:
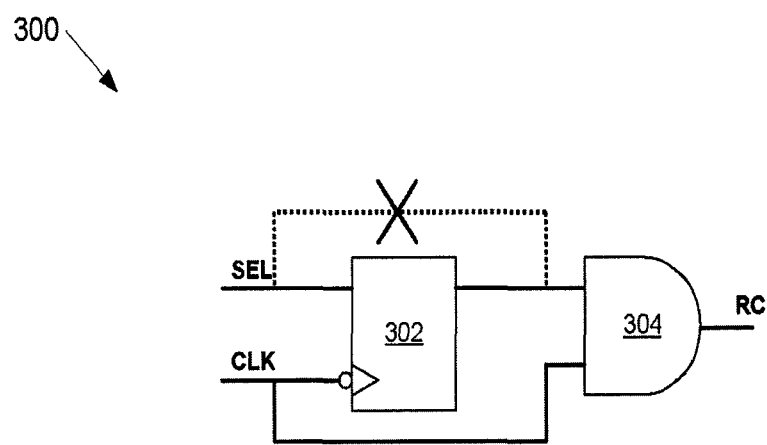
FIG. 3 is a schematic diagram showing an exemplary synchronous de-glitch circuit of the CDR circuit in FIG. 1 according to some embodiments.

FIG. 3 is a schematic diagram showing an exemplary synchronous de-glitch circuit of the CDR circuit in FIG. 1 according to some embodiments. The synchronous de-glitch circuit 106 in FIG. 1 is implemented by an exemplary circuit 300 in FIG. 3. The circuit 300 is used for each phase clock selection choice (e.g., having a phase number 0, 1, 2, 3, 4, or 5, using 5 clock phases) in the phase selector 108 in FIG. 1 to provide a synchronous phase selection for RC.

A D flip-flop 302 has a clock (CLK) input from a corresponding clock phase for the select (SEL) signal, and the clock phases supplied are the same as those supplied to the edge detector 102. The SEL signal corresponds to the edge selection result 105, which enables the appropriate clock phase (among the multiple clock phases) for RC and RD. For each SEL signal (for enabling each clock phase selection choice from multiple clock phases), the D flip-flop 302 receiving the SEL signal is triggered by a corresponding CLK (of each clock phase selection choice). The SEL signal (latched through the D flip-flop 302) and CLK are inputs to an AND gate 304 (i.e., a combinational logic gate) that provides RC, thus the clock recovery data path is provided by a synchronous combinational logic circuit, e.g., 300, in this example. The effect of using the circuit 300 is described below for FIG. 4.

Figure 4:
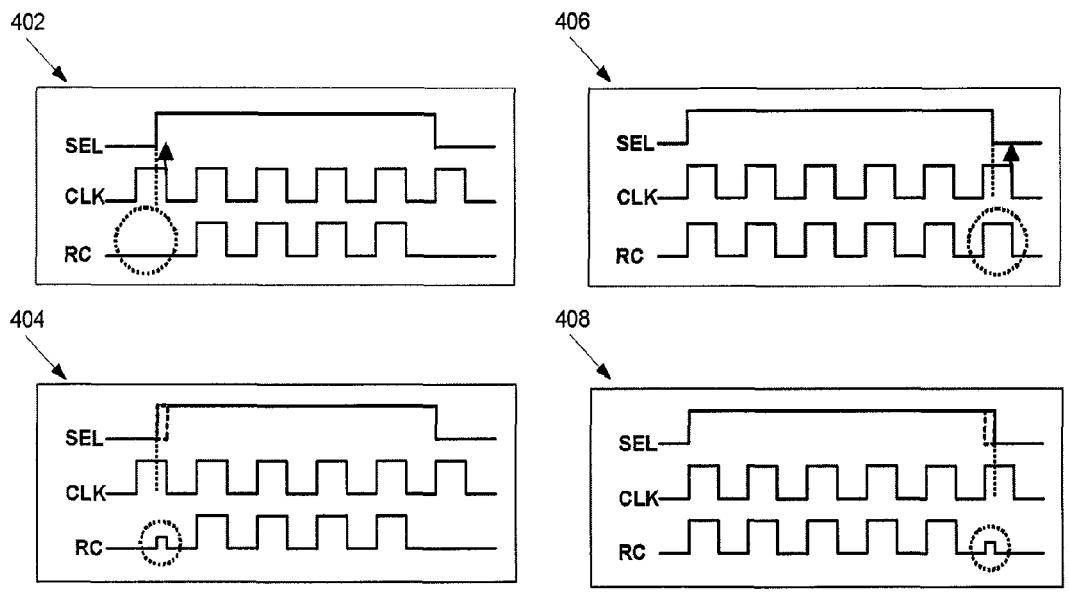
FIG. 4 is a schematic diagram showing de-glitching examples of the synchronous de-glitch circuit in FIG. 3 according to some embodiments.

FIG. 4 is a schematic diagram showing de-glitching examples of the synchronous de-glitch circuit in FIG. 3 according to some embodiments. A diagram 402 shows a case when the SEL signal is enabled (assuming high-enabled) just before the CLK falling edge (assuming the D flip-flop 302 is triggered by a negative edge). Since the D flip-flop latches the SEL signal, the AND gate 304 does not receive the enabled SEL signal right away, and there is no short pulse on RC. However, if the D flip-flop 302 was not used, and instead SEL and CLK were directly coupled to the AND gate 304, RC would have a short pulse (in time) that can incur a glitch, as shown in diagram 404.

Likewise, a diagram 406 shows a case when the SEL signal is disabled just after the CLK rising edge (assuming the D flip-flop 302 is triggered by a negative edge). Since the D flip-flop latches the SEL signal, the AND gate 304 does not receive the disabled SEL signal right away, and there is no short pulse on RC (there is a full pulse instead). However, if the D flip-flop 302 was not used, and instead SEL and CLK were directly coupled to the AND gate 304, RC would have a short pulse (in time) that can incur a glitch, as shown in diagram 408.

The synchronous de-glitch circuit 300 prevents glitch occurrences, thus prevents a system failure caused by glitches, and reduces bit error rate as well as reducing lost packets in an asynchronous CDR system. Even though the D flip-flop 302 was assumed to be negative edge triggered in the above examples, a positive edge triggered D flip-flop can be used in other embodiments depending on implementations, e.g., whether a high-enabled or low-enabled circuit is utilized, etc.

Figure 5:
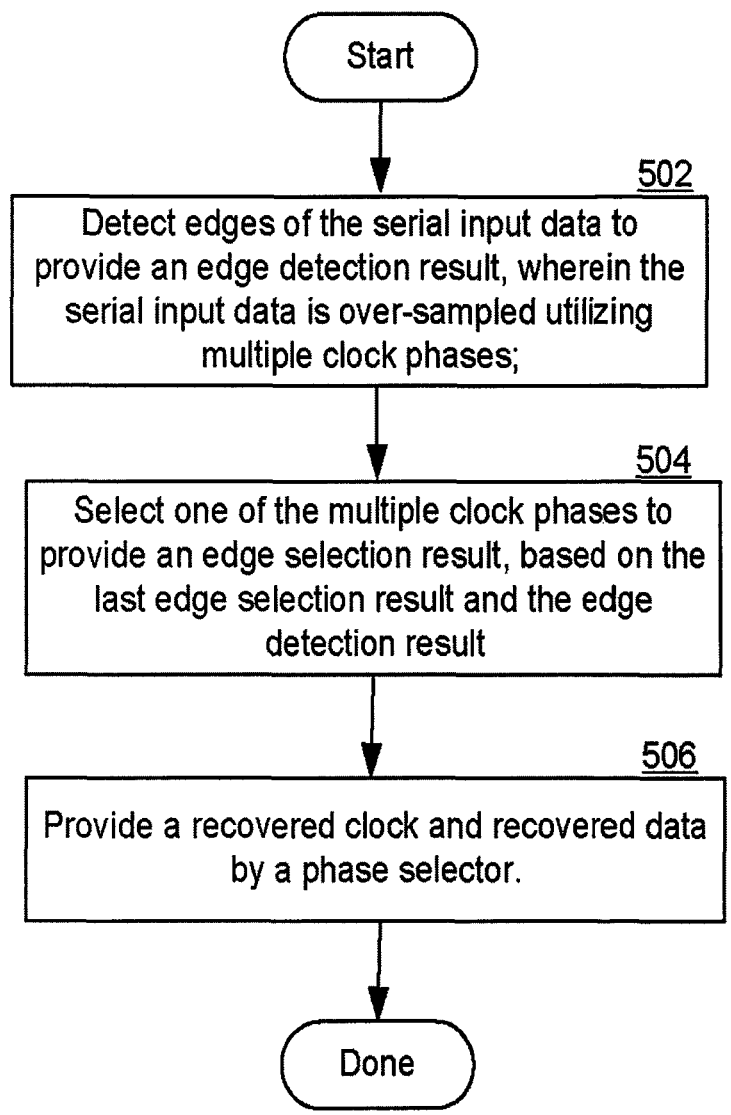
FIG. 5 is a flowchart of an exemplary method for recovering clock and data using the CDR circuit in FIG. 1 according to some embodiments.

FIG. 5 is a flowchart of an exemplary method for recovering clock and data using the CDR circuit in FIG. 1 according to some embodiments. At step 502, edges of the serial input data are detected to provide an edge detection result, e.g., edge detection result 103, wherein the serial input data is over-sampled utilizing multiple clock phases. At step 504, one of the multiple clock phases is selected to provide an edge selection result, e.g., edge selection result 105, based on the last edge selection result and the edge detection result. In some embodiments, selecting one of the multiple clock phases comprises selecting a clock phase close to a middle point between the detected edges of the serial input data. At step 506, a recovered clock (RC) and recovered data (RD) are provided by a phase selector, e.g., phase selector 108, by using the selected clock phase as RC and the data samples based on the RC as the RD.

The method can further include comparing a phase number of a current edge selection result and a phase number of the last edge selection result. The method can further include selecting a new edge selection result if a phase number difference between the current edge selection result and the last edge selection result (that has a phase number X) is Round (N/2), wherein N is a number of the multiple clock phases. In some embodiments, Round (N/2) is a round half up number of N/2. In some embodiments, the new edge selection result has a phase number of X plus Round (N/2) plus 1. The serial input data is oversampled at N phases, and the N phases divide one clock period equally.

In some embodiments, the phase selector, e.g., phase selector 108, is a synchronous phase selector, e.g., includes a synchronous de-glitch circuit 106. The synchronous phase selector includes at least one D flip-flop, e.g., flip-flop 302, and at least one combinational logic gate, e.g., AND gate 304 (in the synchronous de-glitch circuit 106). The synchronous phase selector, utilizes the same multiple clock phases as the edge detector, e.g., edge detector 102.

According to some embodiments, a clock and data recovery (CDR) circuit includes an edge detector, an edge selector, and a phase selector. The edge detector is arranged to detect edges of serial input data and to provide an edge detection result. The serial input data is oversampled utilizing multiple clock phases. The edge selector for selecting one of the multiple clock phases for a recovered clock is arranged to provide an edge selection result, to receive the last edge selection result as a first input, and to receive the edge detection result as a second input. The phase selector is arranged to provide the recovered clock and recovered data.

According to some embodiments, a method for recovering a clock and data of serial input data includes detecting edges of the serial input data to provide an edge detection result. The serial input data is oversampled utilizing multiple clock phases. One of the multiple clock phases is selected to provide an edge selection result, based on the last edge selection result and the edge detection result. A phase selector provides a recovered clock and recovered data.

A skilled person in the art will appreciate that there can be many embodiment variations of this disclosure. Although the embodiments and their features have been described in detail, it should be understood that various changes, substitutions and alterations can be made herein without departing from the spirit and scope of the embodiments. Moreover, the scope of the present application is not intended to be limited to the particular embodiments of the process, machine, manufacture, and composition of matter, means, methods and steps described in the specification. As one of ordinary skill in the art will readily appreciate from the disclosed embodiments, processes, machines, manufacture, compositions of matter, means, methods, or steps, presently existing or later to be developed, that perform substantially the same function or achieve substantially the same result as the corresponding embodiments described herein may be utilized according to the present disclosure.

The above method embodiment shows exemplary steps, but they are not necessarily required to be performed in the order shown. Steps may be added, replaced, changed order, and/or eliminated as appropriate, in accordance with the spirit and scope of embodiment of the disclosure. Embodiments that combine different claims and/or different embodiments are within scope of the disclosure and will be apparent to those skilled in the art after reviewing this disclosure.

What is claimed is:

1. A clock and data recovery (CDR) circuit, comprising:
   an edge detector arranged to detect edges of serial input data and to provide an edge detection result, wherein the serial input data is oversampled utilizing multiple clock phases;
   an edge selector for selecting one of the multiple clock phases for a recovered clock, wherein the edge selector is arranged to provide an edge selection result, to receive the last edge selection result as a first input, and to receive the edge detection result as a second input, wherein the edge selector is configured to provide a new edge selection result if a current edge selection result has a phase number of X plus Round (N/2), wherein the last edge selection result has a phase number of an integer X, and N is a number of the multiple clock phases; and
   a phase selector arranged to provide the recovered clock and recovered data.

2. The CDR circuit of claim 1, wherein Round (N/2) is a round half up number of N/2.

3. The CDR circuit of claim 1, wherein the new edge selection result has a phase number of X plus Round (N/2) plus 1.

4. A method for recovering a clock and data from serial input data comprising:
   detecting edges of the serial input data to provide an edge detection result, wherein the serial input data is oversampled utilizing multiple clock phases;
   comparing a phase number of a current edge selection result and a phase number of the last edge selection result;
   selecting one of the multiple clock phases to provide an edge selection result, based on a last edge selection result and the edge detection result; and
   providing a recovered clock and recovered data by a phase selector; and
   selecting a new edge selection result if a phase number difference between the current edge selection result and the last edge selection result having a phase number X is Round (N/2), wherein N is a number of the multiple clock phases.

5. The method of claim 1, wherein Round (N/2) is a round half up number of N/2.

6. The method of claim 1, wherein the new edge selection result has a phase number of X plus Round (N/2) plus 1.

7. An integrated circuit including a clock and data recovery (CDR) circuit, the CDR circuit comprising:
   an edge detector arranged to detect edges of serial input data and to provide an edge detection result, wherein the serial input data is oversampled utilizing multiple clock phases;
   an edge selector for selecting one of the multiple clock phases for a recovered clock, wherein the edge selector is arranged to provide an edge selection result, to receive a last edge selection result as a first input, to receive the edge detection result as a second input, and the edge selector is configured to provide a new edge selection result having a phase number of X plus Round(N/2) plus 1 if a current edge selection result has a phase number of X plus Round (N/2), wherein the last edge selection result has a phase number of X, and N is a number of the multiple clock phases; and
   a synchronous phase selector arranged to provide the recovered clock and recovered data, wherein the synchronous phase selector comprises at least one D flip-flop and at least one combinational logic gate.

* * * * *